United States Patent [19]

Jacobs

[11] Patent Number: 4,680,931
[45] Date of Patent: Jul. 21, 1987

[54] CONSTANT SPEED CONTROL FOR POSITIVE DISPLACEMENT VARIABLE STROKE HYDRAULIC MOTOR

[76] Inventor: Harvey C. Jacobs, 9710 Harvard St., Bellflower, Calif. 90706

[21] Appl. No.: 476,819

[22] Filed: Mar. 24, 1983

Related U.S. Application Data

[63] Continuation of Ser. No. 132,044, Mar. 30, 1980, abandoned.

[51] Int. Cl.⁴ .............................................. F16D 31/02
[52] U.S. Cl. ...................................... 60/447; 60/448; 91/506
[58] Field of Search ................. 60/444, 445, 447, 448; 91/506; 251/121; 417/216, 218-222

[56] References Cited

U.S. PATENT DOCUMENTS

| | | | |
|---|---|---|---|
| 3,054,263 | 9/1962 | Budzich et al. | 60/447 |
| 3,521,852 | 7/1970 | Gillis | 251/121 |
| 3,986,357 | 10/1976 | Hoffman | 60/447 X |
| 4,102,607 | 7/1978 | Benson | 91/506 X |
| 4,168,612 | 9/1979 | Nikolaus | 60/447 X |

Primary Examiner—Edward K. Look
Attorney, Agent, or Firm—William M. Hynes

[57] ABSTRACT

In a positive displacement variable stroke motor, a constant speed variable power drive governor is disclosed which varies stroke instead of driving pressure and hence conserves power through reducing throttling losses. Typically, the control is used on at least one of a plurality of motors all driven from the high pressure manifold of a pressure compensated controlled pump driven by a prime mover. The particular controlled positive displacement variable stroke motor is connected at fluid intake to the high pressure manifold on the high pressure fluid side and discharges to a reservoir on the low pressure fluid side. The controlled motor also drives a small positive displacement pump—typically an in situ charge pump—and produces a discharge through a square edge orifice in an insolated hydraulic control circuit. In response to load changes, a hydraulic amplifier monitors the pressure in the hydraulic control circuit and changes the motor stroke, typically by changing tilt box angle. With decreasing hydraulic control circuit pressure responsive to increasing load, pump stroke is increased. With increasing hydraulic control circuit pressure responsive to decreasing controlled pump load, pump stroke is decreased. In either case, when the pump stroke reaches its new setting, the small positive displacement pump returns the pressure in its isolated circuit substantially back to the original pressure. A number of exemplary circuits are illustrated including various types of hydraulic amplifiers, dual motor controls, controls for use with reversible motors and an embodiment including a throttle valve in series with the controlled motor.

4 Claims, 6 Drawing Figures

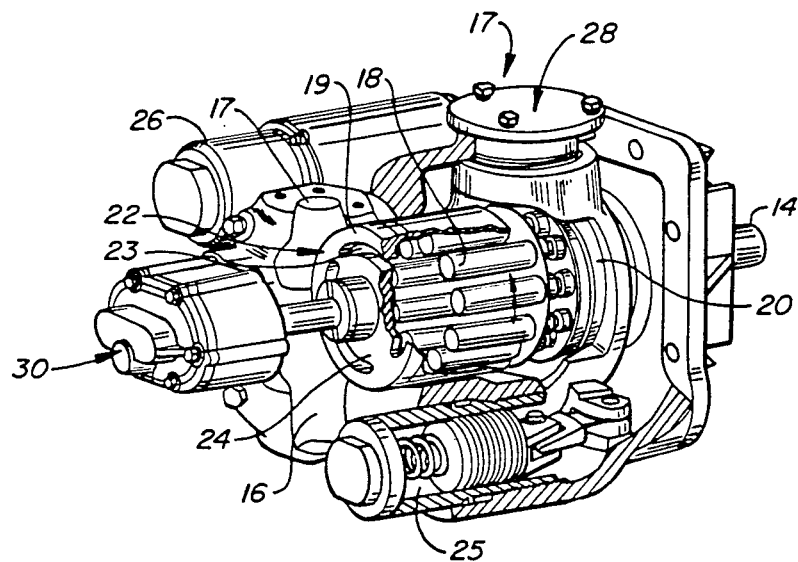
FIG._1.
PRIOR ART
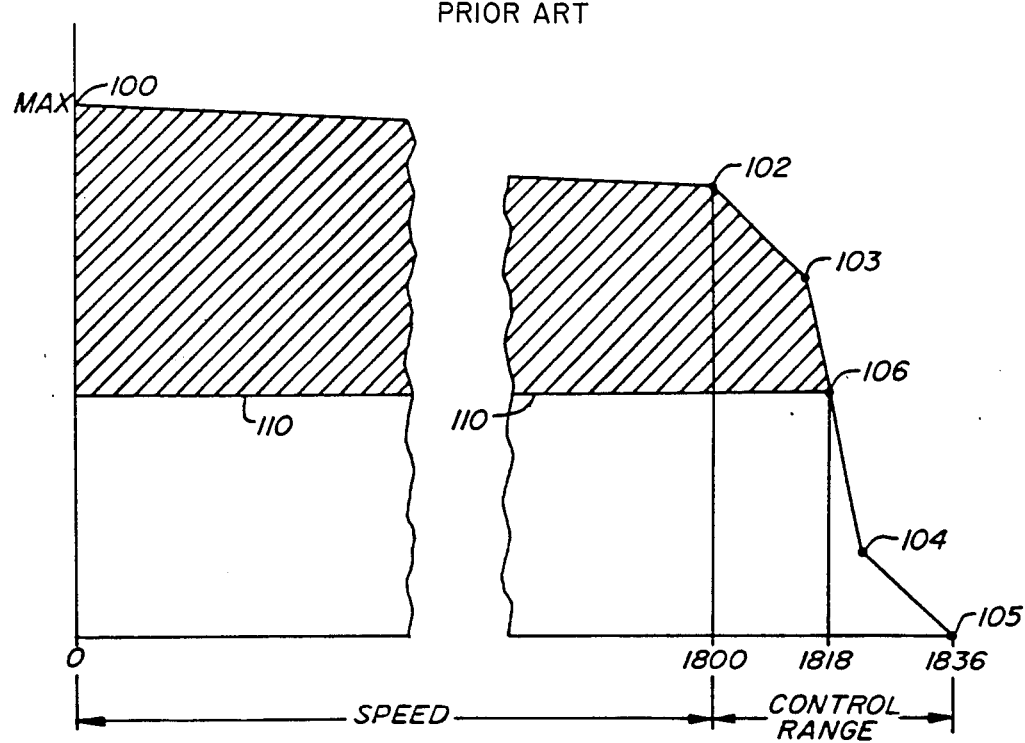
FIG._6.

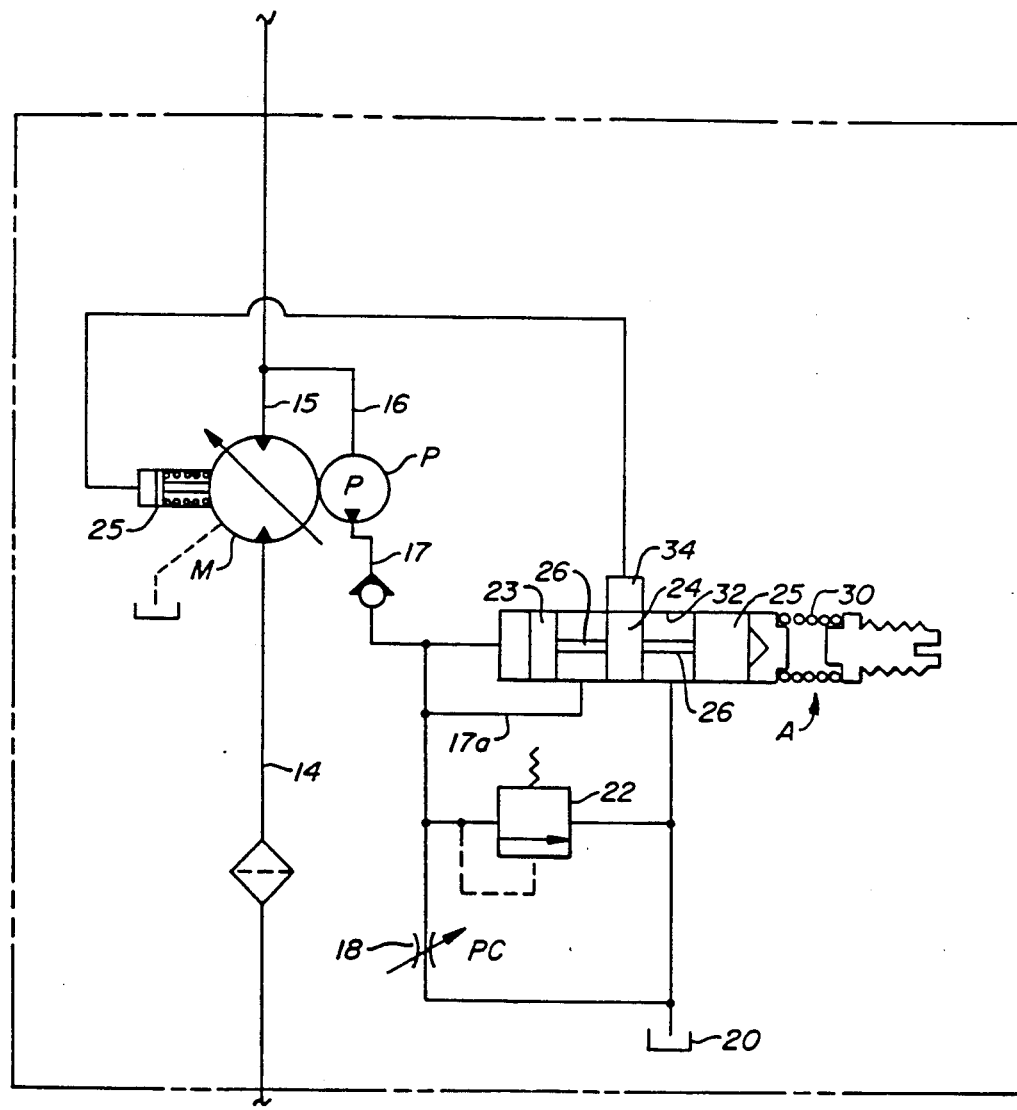
FIG._2.

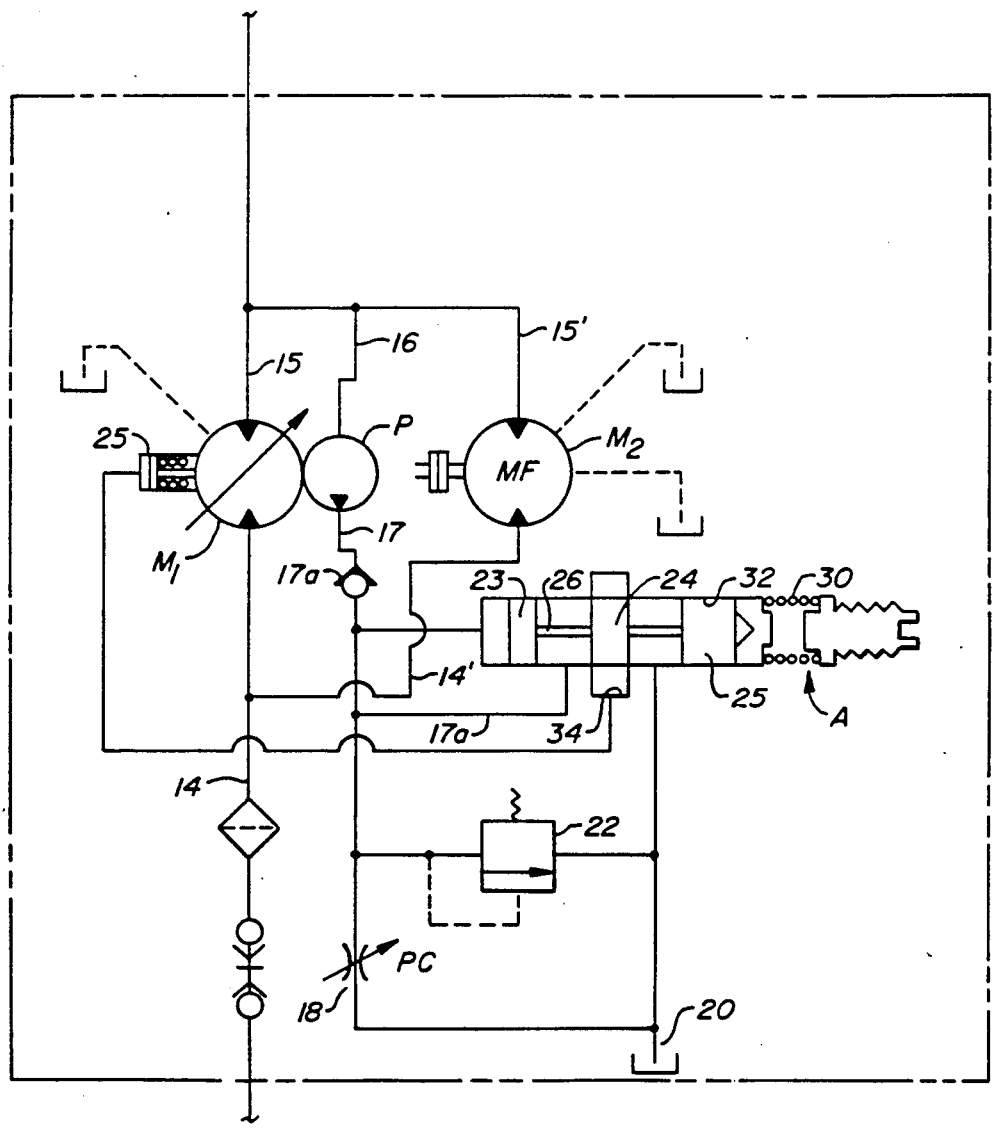
FIG._3.

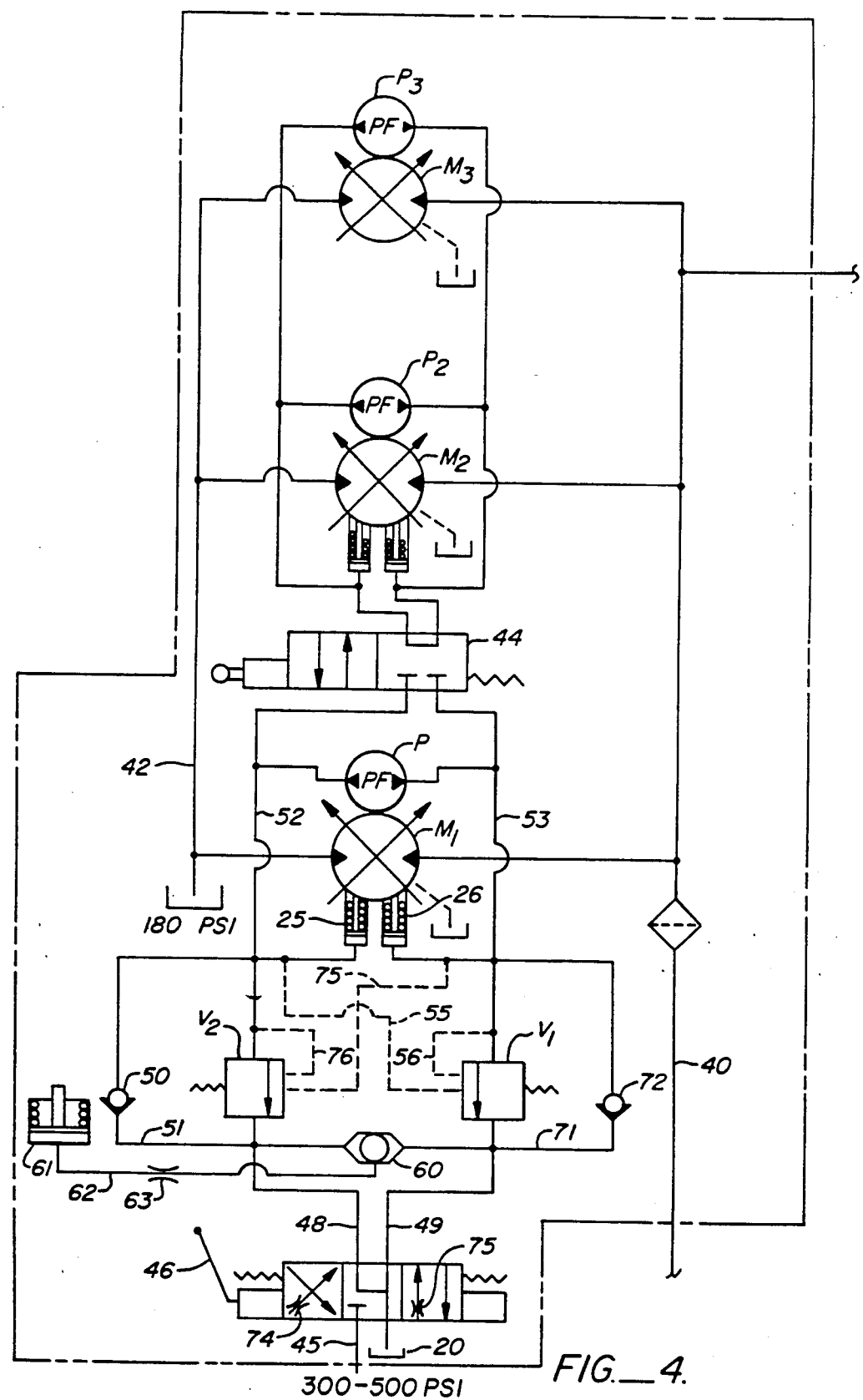
FIG._4.

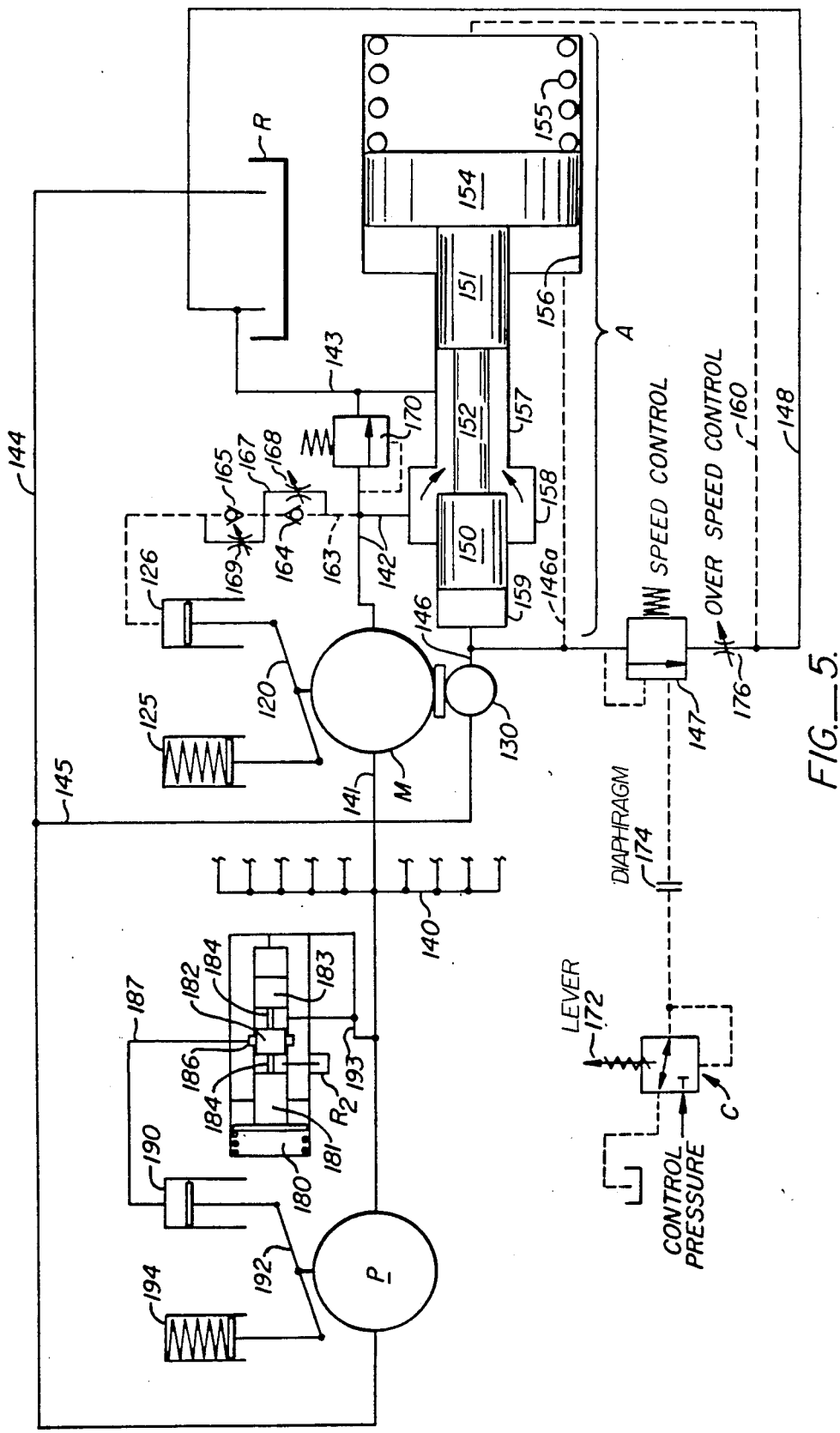
FIG._5.

CONSTANT SPEED CONTROL FOR POSITIVE DISPLACEMENT VARIABLE STROKE HYDRAULIC MOTOR

This application is a continuation of application Ser. No. 132,044, filed Mar. 30, 1980, now abandoned.

This invention relates to hydraulic controls for variable stroke positive displacement hydraulic motors.

SUMMARY OF THE PRIOR ART

Variable stroke positive displacement pump/motors are known. One prominent manufacturer of such motors is the Sundstrand Corporation of Ames, Iowa, who manufactures such a motor under the names Sundstrand Hydrotransmission. Such a motor is illustrated and will be described with reference to FIG. 1.

Referring to FIG. 1, a variable displacement motor M is illustrated having a drive shaft 14 for driving whatever load the pump is connected to. Typically, hydraulic fluid flows in through a port 16 and out through a port 17. The entire pump turns about shaft 14 and includes a series of rotating pistons 18 within a series of rotating cylinders 19.

Operation of the pump can easily be understood. Cylinders 19 communicate to the hydraulic fluid and the pistons 18 communicate to a tilt box 20, the angle of which varies to vary pump displacement. A plate 22 is provided with a series of left apertures 23 and a series of right apertures 24. Noting that tilt box 20 is tilted at an angle away from the viewer and that the entire system of pistons 18 and cylinders 19 is rotating counterclockwise in the view of FIG. 1, it will be seen that hydraulic fluid flows inwardly through light ports 24 and outwardly through left ports 23.

It remains only to be understood that the angle of tilt box 20 can change responsive to the force acting between a springed biased cylinder 25 and a hydraulic pressure control cylinder 26 across paired trunions 28 (top trunion 28 being the only one shown). By having the respective pistons 25, 26 act upon opposing lever arms at opposite sides of the trunion, the angle of the tilt box plate can be changed. Assuming that the tilt box 20 only changes from a disposition normal to shaft 14 to a disposition angular with respect to shaft 14, driving of the motor in one direction will occur. It is known that such motors readily operate in a reversible mode, by corresponding movement of a tilt box.

Where such motors are used in a master-slave relationship, a known amount of hydraulic leakage occurs. This hydraulic leakage occurs both at the pump providing the initial hydraulic power as well as the motor extracting hydraulic power from the system. Typically, both the hydraulic pump and the driven hydraulic motor incorporate known amounts of fluid loss from their high pressure side to their low case and pressure side. The result is that where pumps are utilized in accordance with the overall design of FIG. 1, unless fluid is added to the low pressure side of the provided hydraulic circuit by a small positive displacement, shaft actuated gear pump, known as a charge pump 30, the inlet of hydraulic fluid will not be sufficient to meet the positive displacement requirements of the pump. Consequently, such motors and/or pumps as illustrated in FIG. 1 are often provided with a charge pump as a standard item of manufacture. While such charge pumps in no way suggest the control mechanism of the following invention, it will become more apparent that as a rather surprising result of my discovery and invention, I now use the charge pump—a standard item of manufacture—to effect the overall speed control of the type of motor illustrated in FIG. 1.

Continuing with my prior art description, pumps such as that illustrated in FIG. 1 are typically controlled by a throttle valve. These throttle valves change the pressure inlet to the driving port 24. When the pressure is changed, the speed at shaft 14 varies responsive to the load.

Unfortunately, as is well known in the hydaulic arts, a power loss occurs when pump inlet pressure is throttled. Remembering that horsepower out is a function of pressure drop times flow, any throttling with an accompanying fluid flow is inevitably a power drop. The throttling effect dissipates power in the form of Joule heating of the hydraulic fluid. The heat that is generated typically must be removed by attached coolers; power is completely wasted to the extent of the controlling pressure drop.

It has been known in the past to control variable stroke motors with flyball-type governors. Unfortunately, such governors are extremely limited in the speed ranges which may be controlled. Moreover, where dynamically moving devices such as hydraulic carriages and the like are utilized, governors of the flyball variety are subjected to inertial forces. As a result, they are generally unsatisfactory in other than stationary applications.

SUMMARY OF THE INVENTION

In a positive displacement variable stroke motor, a constant speed variable power drive governor is disclosed which varies stroke instead of driving pressure and hence conserves power through reducing throttling losses. Typically, the control is used on at least one of a plurality of motors all driven from the high pressure manifold of a pressure compensated controlled pump driven by a prime mover. The particular controlled positive displacement variable stroke motor is connected at fluid intake to the high pressure manifold on the high pressure fluid side and discharges to a reservoir on the low pressure fluid side. The controlled motor also drives a small positive displacement pump—typically an in situ charge pump—and produces a discharge through a square edge orifice in an isolated hydraulic control circuit. In response to load changes, a hydraulic amplifier monitors the pressure in the hydraulic control circuit and changes the motor stroke, typically by changing tilt box angle. With decreasing hydraulic control circuit pressure responsive to increasing load, pump stroke is increased. With increasing hydraulic control circuit pressure responsive to decreasing controlled pump load, pump stroke is decreased. In either case, when the pump stroke reaches its new setting, the small positive displacement pump returns the pressure in its isolated circuit substantially back to the original pressure. A number of exemplary circuits are illustrated including various types of hydraulic amplifiers, dual motor controls, controls for use with reversible motors and an embodiment including a throttle valve in series with the controlled motor.

OBJECTS, FEATURES, AND ADVANTAGES

A primary object of this invention is to control motor stroke rather than motor pressure to thereby minimize throttling losses in a fluid motor hydraulic circuit. Typically, a controlled motor is connected to a positive displacement control pump at its output shaft. This positive displacement pump takes suction from a reservoir and discharges across a square edge orifice in a pressure isolated hydraulic circuit. The pressure between pump and orifice is passed to a hydraulic amplifier. The hydraulic amplifier changes tile box angle. Responsive to decreasing speed and increasing load, tilt box angle is moved by hydraulic connection to the amplifier to increase pump stroke responsive to decreasing back pressure. Conversely, with increasing pump speed and decreasing load, the control pump—typically an in situ charge pump—has a relatively high pressure between the pump and its metering orifice. This high pressure in turn causes the attached fluid amplifier to provide decreased pump stroke and hence decrease speed.

Upon return of the pump to a normalized speed, pressure between the control pump and orifice normalizes.

An advantage of this invention is that it saves power. Specifically, it is known that diesel engines in the range of 750 horsepower (a common prime mover utilized with hydraulic systems) consume approximately 0.4 pounds of fuel per horsepower hour. Remembering that diesel engines, their driven hydraulic pumps and the power extracting hydraulic motors are typically all sized for a maximum load condition, it can immediately be seen that operating the diesels at less than full horsepower can save fuel. For example, taking the case of two 1500 horsepower diesels and presuming that 30% of the power is saved, up to 48 gallons of fuel per hour can be saved or 1152 gallons per day.

A special result of my pump is that the system uses an in situ charge pump which is a standard item of manufacture. My control system in the entirety uses no special equipment.

My invention will admit of a number of control embodiment velocities. Accordingly, and in a first and simplest embodiment, I include the use of a hydraulic amplifier in the form of a conventional pressure compensator to amplify the control pressure between the pump and orifice to a hydraulic pressure which directly controls motor stroke.

In an alternate embodiment, I include a compensator controlling both a variable stroke hydarulic motor and a fixed stroke hydraulic motor, both these motors being operated in parallel. By the expedient of using the reversible characteristic of a variable stroke hydraulic motor, the overall motors operable on the same shaft can move from a first disposition with virtually no power output where the motors are hydraulically opposed one to another to a second and final disposition wherein the motors operate together in parallel to provide combined and additive power output.

According to another aspect of my invention, I illustrate a reversible motor control with control of piston stroke operable to not only vary motor stroke for the desired power setting, but additionally to operate other similarly situated motors in series.

An additional advantage of my control system is that the speed monitoring pump and its associated fluid circuit is pressure isolated from the driving fluid circuit of the prime mover. This being the case, the entire system is pressure independent from any prime mover pressure variations. My control will always seek to maintain constant hydraulic motor speed even though there is substantial variation in the driving pressure.

A further object of this invention is to disclose a self-braking pressure relief system for the hydraulic motor. According to this aspect of the invention, there is provided a relief valve across the discharge of the motor directly to the reservoir and around the hydraulic amplifier. Where the prime mover undergoes a sudden stop, momentum at the prime mover cannot cause pressure spiking. Instead, the fluid motor in effect pumps its momentum away as a pressure loss across the installed relief valve.

A further object of this invention is to provide my controlled motor with variable speeds. According to this aspect of the invention I only need vary the size of the controlled orifice. The controlled speed follows as a direct result of the variable orifice.

Other objects, features, and advantages of this invention will become more apparent to the reader after further referral to the remaining portion of the specification and the attached drawings.

BRIEF DESCRIPTION OF THE DRAWINGS

FIG. 1 is a drawing of a prior art positive displacement controlled stroke pump such as that manufactured by the Sundstrand Corporation of Ames, Iowa under the marks SUNDSTRAND HYDROTRANSMISSION, a registered trademark of the Sundstrand Corporation;

FIG. 2 is a schematic of my invention illustrating the control of a positive displacement variable stroke non-reversible motor through the hydraulic governor of my invention with the pressure of the governor controlling the position of an amplifier in the form of a hyraulic compensator;

FIG. 3 illustrates a simultaneous control of a fixed stroke hydraulic motor and a variable stroke hydraulic motor with the variable stroke hydraulic motor moving from a position of opposition to a position of being parallel to the effort of the fixed stroke motor, the control mechanisms remain substantially unchanged;

FIG. 4 is an illustration of my invention utilized to drive and control reversible hydraulic motors on a device such as a carriage;

FIG. 5 is a hydraulic circuit schematic of my invention utilizing a control motor back pressure to produce such a desirable control characteristic; and FIG. 6 is a torque speed diagram illustrating the control characteristics of my invention.

DETAILED DESCRIPTION OF THE INVENTION

Having set forth in FIG. 1 the configuration of the motor, the schematics of FIGS. 2, 3, 4 and 5 will be sufficient to understand the operation of this invention. First, the control of various motor arrangements motor will be set forth. Finally, the speed-torque characteristics will be discussed with respect to FIG. 3.

Referring to FIG. 2, a high pressure line 14 drives a positive displacement variable stroke motor M with hydraulic discharge occuring to a discharge line 15 and thence to a return (not shown). Coaxially connected to the shaft of the motor M is a positive displacement control pump P. Pump P draws a suction from a line 16 and discharges to a line 17 across a variable orifice 18 to a reservoir 20. Provision is made at a relief valve 22 to enable overpressure to be discharged.

A hydraulic amplifier A here shown in the form of a compensator monitors the control pressure in line 17 between pump P and the variable orifice 18. Specifically, the compensator includes three spools 23, 24, 25 all connected by a common shaft 26 and biased against a spring 30 within a cylinder cavity 32.

Operation of the device may be easily understood. Assuming that the motor M comes up to speed, a control pressure will be generated between the pump P and the valve 18. This control pressure will be monitored by the amplifier A and in effect balanced against the spring constant provided by spring 30.

Upon the motor receiving an underspeed condition, the spool assembly will shift to the left, enlarged passageway 34 will communicate hydraulic fluid outflowing from the control cylinder 25. The motor will then come offstroke in the manner described with respect to FIG. 1.

Assuming that the load of motor M decreases, the motor will overspeed. Pump P will increase the pressure in line 17 and through orifice 18. With such increased pressure, biasing of the spool assembly 23, 24, 25 to the right will occur. Pressure will be communicated from line 17 through the pressure side to cylinder 25. Motor will come offstroke.

It will be seen that amplifier A serves in effect to balance the motor control responsive to the load on the motor. As will hereinafter be more fully set forth, by variation of the throttle valve 18, a speed range for the motor may be selected, which speed range is independent of the power.

Referring to FIG. 3, an alternate embodiment of my invention is illustrated. Two motors $M_1$, $M_2$ are connected to a common shaft. Motor $M_1$ is a positive displacement variable motor. Motor $M_2$ is a positive displacement fixed stroke motor. Understood in the terms of FIG. 1, the tilt box 20 is preset in motor $M_2$. It remains set to a constant angle.

Motor $M_1$ has a variable tilt box. This tilt box varies from a first position where it is in opposition to motor $M_2$ to a second position in sympathy with motor $M_2$.

Operation of this speed control is analogous to that shown in FIG. 2. Broadly, an inlet pressure line 14 drives motor $M_1$ while line 14' drives motor $M_2$. Discharge occurs through lines 15, 15' to a reservoir not shown. Pump P takes a suction 16, discharges through check valve 17a to variable throttle 18, finally to a reservoir 20. A relief valve 22 is provided to bypass pressures in the event of motor overspeed. Operation is precisely the same as that previously illustrated.

For a condition of increased load, pump P slows down. In slowing down, the pressure in line 17 to orifice 18 drops. Upon experiencing pressure drop, the spool shifts to the left from the bias of spring 30 within cylinder 32 and thereby allows oil to escape from control cylinder 25 to reservoir 20. Motor $M_1$ goes on stroke.

Considering the case whereby motors running in parallel overspeed to a decrease in load, the pressure between pump P and throttle valve 18 rises. Upon such increase in pressure, the spool assembly 23, 24, 25 shifts to the right. With such a shift, pressure from the discharge line 17 through line 17a communicates to enlarged portion 34 of the compensator with the pressure being communicated to control cylinder 25. Motor $M_1$ comes offstroke.

It will be appreciated that motor $M_1$ may in effect have a reversible drive. Thus the motor can go from a position fully in opposition to motor $M_2$ to a position fully in sympathy with motor $M_2$.

Referring to FIG. 4, yet an alternate embodiment of this invention is illustrated. In this embodiment, three reversible motors $M_1$, $M_2$, $M_3$ are all shown run of of a common inlet 40, with common discharge to a discharge line 42. These particular motors are run in a reversible mode and will be set forth with respect to motor $M_1$. Once the operation of motor $M_1$ is understood, the coupling and uncoupling of motors $M_2$, $M_3$ via the hydraulic clutch mechanism 44 can then be set forth.

Typically, a control pressure in the range of 300–500 psi is provided to an inlet valve 45. Inlet valve 45 is a three-way valve biased by a throw rod 46 against opposing center biasing spring forces. Assuming that valve 46 is thrown to the left position, it will be immediately seen that line 48 is communicated to a source of pressure and line 49 communicated to a reservoir. Assuming that the motor is in the stop position, fluid passage will occur through check valve 50 in line 51. Such fluid flow will proceed through line 50 to line 52 wherein, and assuming motor $M_1$ is in the stop position, the pump P will act as a closed valve. The fluid pressure from the control circuit in line 45 will thence see its way to one of two opposed control cylinders 25 and motor $M_1$ will go on stroke in a first condition.

Once the motor is on stroke in the desired condition, fluid will pass pump P from line 52 to line 53. At line 53, the passed fluid will see its way through a pressure relief valve $V_1$. Typically, relief valve $V_1$ will be biased by a lines 55, 56 to a position where some relief of the control pressure from pump P occurs. Once relief valve $V_1$ opens, fluid will flow through line 49 down to the reservoir.

Thus, dependent upon the position which handle 46 is in, there will occur a control of the motor $M_1$.

In the particular circuit of FIG. 4, this circuitry has been designed by me for the control of a movable carriage. This being the case, it will be noticed that a special valve 60 is actuated to release a brake 61 to line 62 containing valve 63. Thus in the absence of hydraulic pressure, brake 61 engages preventing carriage movement altogether.

Assuming movement in the opposite direction is desired, handle 46 is shifted fully to the right. In this position, line 49 gets communicated to a source of pressure with pressure passing through conduit 71 and check valve 72 to bring cylinder 26 on stroke. When motion of the motor commences, pump P causes pressure to be exerted on line 52. Dependent upon the pressure in line 71, a lines 75, 76 will cause valve $V_1$ to move to the slightly open position, pressure will be relieved on line 52 through to reservoir 20. There will result an equilibrium in the system which equilibrium will cause a steady state movement of motor $M_1$.

It will be noticed that valve 46 includes in portions of the throttle therein illustrated, the variable throttle mechanisms 74, 75. These respective throttle mechanisms enable motor speed to be controlled.

Referring to control lines 52, 53 of the pressure drop generated thereacross, it can be seen that by the utilization of clutch mechanism 44, respective motor $M_2$ with pump $P_2$ and motor $M_3$ with pump $P_3$ can be switched on and off the line. In each of these cases, the function of the system is precisely analogous.

Having set forth these two embodiments of my invention, attention may now be directed to FIG. 5.

In FIG. 5 I have caused to be added to the control mechanism an amplifier of the configuration previously illustrated in my U.S. Pat. No. 3,807,443, issued Apr. 30, 1974. I incorporate that patent by reference. The information may be summarized as follows:

A pressure regulated constant flow valve has a fixed orifice and a regulated orifice in series, the regulated orifice maintaining a constant pressure drop across the fixed orifice. To maintain the pressure regulation effective for either direction of flow through the valve, a shuttle valve shifts when the direction of flow is reversed and reverses the connections of the regulator with the upstream and downstream sides of the fixed orifice.

A typical claim is as follows:

1. A bi-directional, pressure compensated, flow control valve comprising a fixed orifice and a regulated orifice in series, orifice regulating means having opposed opening and closing areas, a shuttle valve connected to the regulating means and shiftable to connect the closing area with the upstream side of the fixed orifice, and to connect the opening area with the downstream side thereof for each direction of flow through the valve.

Reference is made to the mechanism illustrated in FIG. 5 as amplifier A as being the incorporated portion of my previously issued U.S. Patent, the illustrations here and there being substantially identical.

The amplifier A which I incorporate in my embodiment of FIG. 5 may also be found fully described in the Sperry-Vickers *Industrial Hydraulic Manual,* 1st Ed. (1970), published by the Sperry-Rand Corp. of Troy, Mich. An explanation of this valve may be found at page 9-12 at FIG. 9-12 (and text relating thereto), the only difference being that the control pressure for the amplifier therein illustrated is taken from the inlet to the fluid motor instead of the pressure generated between the positive displacement pump P and orifice.

Referring to FIG. 5, pump P has an output of hydraulic fluid to a manifold 140. Motor M is a typical variable stroke positive displacement pump utilized in such installations. Motor M receives hydraulic fluid on its high pressure side 141 from a branch of manifold 140 and discharges fluid to its low pressure side 142 through a fluid amplifier A to a reservoir R through discharge line 143. Reservoir R in turn provides the suction side of pump P with fluid through a return line 144 so that the prime mover of pump P can provide motor force to the manifold 140 and again to the high pressure line 141 into motor M.

Motor M at its charge pump 130 has an independent hydraulic circuit. Charge pump 130 has an inlet line 145 and a discharge 146. Discharge 46 discharges through a variable square edge orifice 147 to a reservoir discharge line 148. It is the pressure maintained between the discharge of charge pump 130 and line 146 to the variable square edge orifice 147 which is the control pressure to fluid amplifier A.

Fluid amplifier A comprises paired spools 150, 151 connected by a shaft 152 to a hydraulic piston 154. Piston 154 is spring biased by a spring 155. Piston 154 fits within a large piston cylinder 156 while a reduced piston cylinder 157 with an enlarged inlet opening 158 provides for passage of hydraulic fluid. A narrow chamber 159 mating piston 150 is illustrated to drive spool 150 into and out of a partially occluding position within chamber 158.

In operation, the fluid discharged from motor M passes through conduit 142 into the enlarged portion of cylinder 158. From enlarged portion 158, the fluid passes between cylinder 150 and shaft 152 to discharge line 143 (this latter line being schematically shown). Fluid passes from discharge line 143 to reservoir R.

Compared to prior art apparatus, it will be noticed that the throttling of this invention is downstream. It is not contained upstream of the motor M. Further, fluid amplifier A is given a setting so that piston 150 interior of chamber 158 and cylindrical chamber 157 has a minimal pressure drop. Preferably, the pressure drop is of the order of 200 pounds with the overall pressure differential of the system being in the range of 3000 pounds. Thus any throttling which the fluid amplifier A gives to the entirety of the system is minimal.

It will be noticed that the pressure of outflow between outflow 146 of charge pump 130 and the variable square edge orifice 147 is communicated to fluid amplifier A at two apertures. First, a static pressure goes to cylindrical portion 159 where it acts on the end of cylinder 150. Secondly, a pressure line 146a goes to cylinder 156 where it acts against cylinder 154.

Counteracting this hydraulic pressure, there is a line 160 which communicates to chamber 156 on the opposite side of piston 154. This pressure from the low pressure or discharge side of the variable square edge orifice 147 together with the set spring pressure 155 selects the medial and relatively low back pressure position of cylinder 150 of the amplifier A.

Having described the configuration of the amplifier, the operation of the amplifier will now be set forth.

Assume that motor M picks up an increased load. When this happens, its shaft speed will typically drop. Upon dropping of the shaft speed, the pressure in line 146 between the variable square edge orifice 147 and the charge pump 130 will drop. When this pressure drops, the fluid pressure in chambers 159 and 156 will likewise decrease. Consequently, bias of the fluid amplifier will be to have spring 155 move cylinders 150, 151, 152 and 154 to the left. Back pressure on the pump will drop.

The immediate effect of the drop and back pressure on the pump will be two-fold. First, motor M will see less back pressure between itself and reservoir R. This being the case, more power will be immediately produced. As will hereinafter be set forth, with a pressure-regulated pump P, this has a beneficial time constant effect. Secondly, because the back pressure is reduced on the pump, chamber 158 will see less pressure. This will be because of two distinct effects. The first is that because piston 150 slides further into and penetrates chamber 159 and at the same time opens the opening between chambers 157 and 158, the natural and unobstructed fluid flow between the two chambers will reduce the back pressure. The second is that because the constriction between the chambers 158 and 157 is opened, any Bernoulli effect present will be reduced. Such effects are important in considering the closure of an apparatus such as amplifier A.

Now let us consider the overspeed of motor M due to a decreased load. when such overspeed occurs, the pressure in line 146 rises. By the same considerations previously discussed, the fluid pressure in chambers 159 and 156 will increase. Biasing movement of the cylinders 150, 151, 152 and 154 will all occur to the right.

As an immediate effect in the overspeed condition, motor M will see increased back pressure. Responsive to increased back pressure, the motor will turn at a slower rate because it has less power in the pressure drop between manifold 140 and the reservoir R. The back pressure of the motor in chamber 158 will rise for two reasons. The first is that the constriction which cylinder 150 produces between chambers 158 and 157 will go to a smaller area. With more of a restriction, back pressure in chamber 158 naturally will rise. The second is that the Bernoulli effect which draws piston 150 towards chamber of the sidewall 157 will likewise increase. Thus the movement of the piston assembly 154 against the spring 155 will be present.

Having set forth the immediate effects produced by fluid amplifier A, attention will now be directed to how the back pressure on the pump controls the angle of the tilt box plate 120 to motor M and varies the stroke responsive to that back pressure.

Broadly, chamber 158 connects through a conduit 163 to cylinder 126. Typical connection is made through a conduit including opposed check valves 164, 165 and a throttling bypass 167 with paired throttle valves 168, 169 contained therein. These throttle and/or needle valves 168, 169 provide an adjustable time constant to movement of the tilt box 120 as actuated by cylinder 126 on spring bias cylinder 125. Remembering the provision previously discussed about the function of amplifier A, the operation of the circuit to effect change in motor stroke upon first an underspead condition and second an overspeed condition can now be set forth.

Regarding an underspeed condition, it will be apparent that motor M picks up increased load. When increased load was first acquired, it will be remembered that the back pressure in chamber 158 decreased. Such decreasing back pressure through conduit 163 to cylinder 126 (and through the needle valves 168, 169) will reduce the pressure in piston 126. Consequently the spring bias of piston 125 will cause the pump M to undertake additional stroke. When the pump undertakes additional stroke, more fluid will pass through the pump, further power will be delivered and charge pump 130 will increase in its output. Once the pump 130 increases in its output, the pressure in conduit 146 and adjustable orifice 47 will return to normal. At this point, the fluid amplifier will return to its normal position, leaving the tilt box 120 in its position of increased stroke.

Responsive to an overspeed condition, where motor M experiences less load, it will be remembered that the back pressure in chamber 158 increased. Upon increase in back pressure, hydraulic pressure on cylinder 126 will increase. The tilt of box 120 will become less and the resultant piston stroke will be reduced. As the piston stroke is reduced, motor M will decrease or return to a normal speed range. Returning to the normal speed range will cause charge pump 130 to put out a reduced pressure on line 146. With a reduced pressure on line 146, amplifier A will return to the normal position. Equilibrium will be restored to the system with the motor M in a position of decreased stroke.

Having explained my invention thus far, it will be apparent that by varying stroke instead of pressure drop, I vastly reduce throttling losses within the system. Instead, my motors M only call upon that amount of hydraulic power out from pump P as is required to run to my manifold 140.

Before I proceed to a speed torque explanation of FIG. 6, several points should be made.

First, I have provision for that contingency wherein motor M has a high inertial load on it, and pump P suddenly shuts down. Upon such a condition, it will be seen that amplifier A could restrict all fluid flow through the system. To prevent such a result, I have a relief valve 170 which enables a throttling fluid flow between conduit 142 and reservoir R. This conduit serves the dual function of preventing an over-pressured spike on the discharge side of the pump as well as providing a throttling loss to dissipate hydraulic energy interior of motor M.

Secondly, I provide for a control to my variable square edge orifice 147. Specifically, a standard variable pressure hydraulic control C actuated by a lever 172 actuates through a diaphragm 174 to control the position of the orifice 147. By varying the position of the orifice 147, the control characteristics of the motor can be varied as will hereinafter be described with respect to FIG. 6.

Additionally, to prevent system overspeed in the event that motor M suddenly loses all power, I provide an overspeed control orifice 176. This orifice functions in series with the variable orifice 147 so that charge pump 130 will always see back pressure, especially when during overspeed charge pump 130 on an uninhibited basis discharges through a fully open square edge orifice 147.

Having set forth the general operating conditions of my invention, attention will now be given to the configuration of a prior art pressure compensated control pump power source. This power source will be described so that a serendipitous result of my invention in conjunction with such power sources can be understood.

Typically, a pump P is driven by a prime mover (not shown) such as a diesel engine. This pump P has the same configuration as that previously illustrated in FIG. 1, with the only difference being that the shaft 114 is driven by the motor instead of providing a driving motive force.

The output of the pump on the high pressure side is communicated to a piston and spool assembly, including a spring biased piston portion 180 and attached spool assemblies 181, 182, 183, all of these spool assemblies being connected by a common shaft 184. There is an enlarged chamber 186 between spool assemblies 181 and 183, which enlarged chamber 184 is normally obstructed by spool assembly 182. The outflow from this chamber passes along conduit 187 to a control cylinder 190. Control cylinder 190 varies the tilt box 192 of pump P against a spring biased cylinder 194 in the manner that has previously been illustrated.

Operation of the device is well understood in the prior art and will be briefly set forth here only for clarity of understanding. Specifically, where the pressure at manifold 140 drops (indicating that all the motors M are consuming more power) the pressure against the spool assemblies 181, 182, 183 will likewise drop. Spool 182 will move to the right out of an obstructing position to chamber 186. The spring bias of piston 194 will act against piston 190 with a discharge to a reservoir $R_2$ occurring until pump stroke P increases. When the pump stroke P increases, more flow will be added to the system.

Where there is a pressure increase, the effect will be the opposite. Specifically, the spool assembly 181, 182, 183 will move to the left with spool 182 no longer obstructing the path between a conduit 193 and conduit 187. Higher pressure will be communicated to cylinder 190 with the tilt box 192 calling for less pump stroke. With less pump stroke, the flow will decrease.

With such systems throttle valves A and B can cause a hunting; the explanation for this hunting is relatively simple.

Typically, the throttle valves dissipate the power required between a full load operation at motor M and that power which motor M is in fact using. That is where motor M is running at a relatively low output torque, great amounts of energy are consumed in throttling losses.

Assuming that more power is suddenly called for, a throttle valve to motor M would suddenly open. At the same time, motor M will increase its stroke. Upon such sudden opening and increased stroke, the pressure in conduit 140 would drop even more. The spool assembly controlling the pump P would call for additional stroke. Pump P typically would be called upon to overcompensate. There could result a hunting which, depending upon the time constants involved in the respective controls, could be even unstably resonant in overall effect.

It will be remembered, however, that with my present control, the back pressure on motor M immediately drops responsive to an underspeed condition. Accordingly, motor M sees a greater pressure drop when experiencing greater load. Seeing a great pressure drop, it has greater hyraulic energy to consume responsive to that pressure drop. Thus in my present invention, the upstream pressure at inlet 141 from manifold 140 will remain substantially unchanged immediately responsive to increased load at motor M.

A further aspect of this invention will be appreciated by those skilled in the art. Specifically, it will be seen that the hydraulic circuit between the charge pump 130 and the orifice 147 is independent of any pressure in manifold 140 produced by pump P. This being the case, motor M will always seek to maintain its desired speed.

Having set forth the operation of the circuit, the torque speed characteristics can now be explained. Referring to FIG. 6, a hypothetical torque speed characteristic of the control drive is shown. Specifically, speed is plotted on the abscissa with torque being plotted on the ordinate. A maximum torque placed by the machine will occur at zero speed at point 100.

Assuming that the motor is operating at full power and full speed, fluid amplifier A will be in the full open position with the tilt box set at a maximum. This will occur at point 102 of the torque speed curve. Motor rpm is labeled with the set speed here being illustrated as 1800 rpm's. For convenience of size, the torque speed curve is broken off to illustrate on an expanded basis the range between 1800 and 1836 rpm's, the total speed range of the orifice setting set forth here.

Responsive to decreasing load, amplifier A will close, causing a back pressure. This back pressure will reduce the torque along a line of essentially constant slope to a point 103.

When amplifier A responsive to the increased speed of the motor has reached its adjusted and biased position, movement of tilt box 120 will occur to change piston stroke. Such movement will occur from points 103 to 104 responsive to decreasing load. This movement will occur until the tilt box 120 is in the minimum displacement condition.

When the minimum displacement condition is reached, only movement of amplifier will occur. Such movement will occur until the back pressure is equal to the pressure in the manifold 140, and essentially no turning of the motor occurs. This maximum speed at essentially zero power output of the motor is illustrated at point 105.

It will be appreciated that line 102-103 and line 104-105 on the enclosed graph are essentially exaggerated. They are presented here only so that understanding may be increased of the fluid amplifier A on the torque speed curve. Moreover, the particular speeds here chosen are exemplary.

Assuming that a motor runs at about 50% of the power rating, the motor would run at a total speed of 1818 rpm at a half power rating. This half power rating is illustrated by point 106 on the curve between points 103 and 104. If the motor had been run with an upstream throttling valve, that area of the curve above line 110 would represent the power loss that a motor would have.

It will be noted that points 102, 103, 106, 104 and 105 all include what might be referred to as a reverse S-shaped curve. It will be appreciated by those skilled in the art that the variation of the orifice at 147 will in effect shift the reverse S-shaped curve left to right depending upon whether the variable square edge orifice is open or closed. Where the orifice is closed, shifting of the reverse S-shaped curve will occur to the left of the diagram in FIG. 6. Where the variable square edge orifice 147 is opened, shifting will occur to the right.

It should be understood that in all cases I illustrate here a square edged orifice which is definitely preferred. As it is known that square edged orifices vary their pressure drop with the approximate square of the fluid flow across them, I find that square edged orifices are a particularly preferred control orifice to use with my invention. These orifices when used provide a relatively large variation in pressure for relatively small variations of flow. Improved control results.

In summary, it can be seen that the present invention provides a surprisingly efficient and simple control system for hydraulic motors. While the above represents a full and complete disclosure of the present invention, alternate embodiments, equivalents, and the like may be employed. For example, while variable stroke motors are disclosed, other variable displacement devices may be used. Therefore, the foregoing description should not be construed as limiting the scope of the present invention which is defined by the appended claims.

What is claimed is:

1. A control mechanism for at least one positive displacement variable stroke motor connected across a pressure drop in a hydraulic line supplied with fluid under pressure by a prime mover, said control mechanism comprising:

a positive displacement pump connected to the shaft of said motor, said positive displacement pump having a fluid circuit independent of said pressure drop and connection to said prime mover with a discharge across an orifice to provide a control pressure between said pump and said orifice varying responsive to the speed of said motor;

a fluid amplifier for amplifying the control pressure, said fluid amplifier having an output; and means for varying the stroke of said motor communicated to said fluid amplifier responsive to the output of said fluid amplifier.

2. The control mechanism of claim 1 and wherein said positive displacement pump connected to the shaft of said motor is a charge pump.

3. The control mechanism of claim 1 and wherein said orifice is a square edge orifice.

4. The control mechanism of claim 1 and wherein said fluid amplifier includes a spring bias for balance against the control pressure between said positive displacement pump and said orifice.

* * * * *